United States Patent [19]

Yoshida

[11] 4,305,658

[45] Dec. 15, 1981

[54] MOVING OBJECT INSPECTION SYSTEM

[75] Inventor: Hajime Yoshida, Tokyo, Japan

[73] Assignee: Hajime Industries Ltd., Tokyo, Japan

[21] Appl. No.: 109,976

[22] Filed: Jan. 7, 1980

[30] Foreign Application Priority Data

Jan. 19, 1979 [JP] Japan .................................. 54-4969

[51] Int. Cl.³ .............................................. G01P 3/40
[52] U.S. Cl. ..................................... 356/23; 358/106
[58] Field of Search ................. 356/23, 372, 388, 394; 358/93, 101, 106, 107

[56] References Cited

U.S. PATENT DOCUMENTS

| 3,275,744 | 9/1966 | Dietrich | 356/23 |
| 3,390,229 | 6/1968 | Williams | 356/23 |
| 3,577,153 | 5/1971 | Yagi et al. | 358/93 |

Primary Examiner—R. A. Rosenberger
Attorney, Agent, or Firm—Thomas R. Morrison

[57] ABSTRACT

A moving object inspection system is disclosed in which a stroboscope radiation is made on an object to be inspected, the object is picked up by a television camera, a position detection device provides a position detection signal when the object arrives at a specified position, and an object inspection apparatus is provided. In this apparatus the period including before and after the horizontal synchronizing signal from the television camera is set as an inspection intermission period during which no inspection for the object is conducted, and the stroboscope radiation is carried out at the same timing as the position detection signal when the position detection signal arrives at the same time as the vertical synchronizing signal from the television camera, or at the beginning of the inspection intermission period immediately after the position detection signal when the position detection signal arrives at any other time than with the vertical synchronizing signal.

A moving object inspection system further sets an inspection inhibit period of the object immediately after the stroboscope radiation.

5 Claims, 4 Drawing Figures

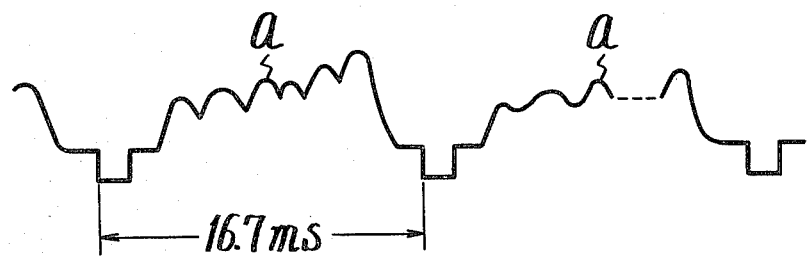
FIG. 3A
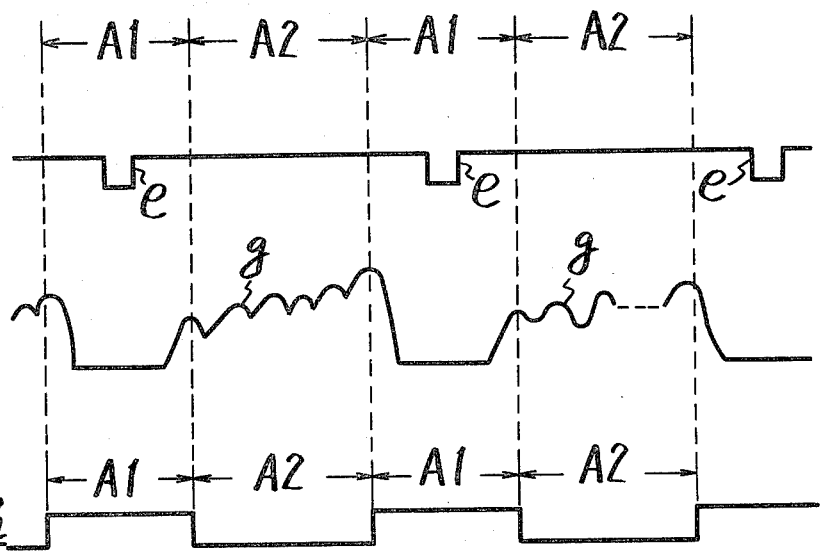
FIG. 3B
FIG. 3C
FIG. 3D
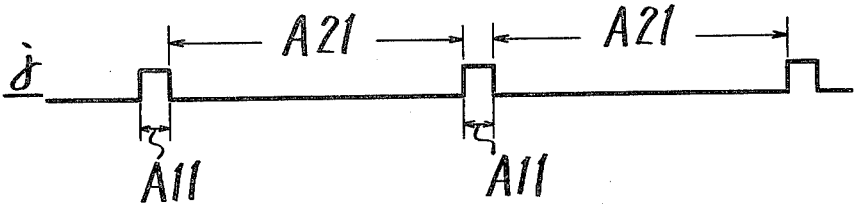
FIG. 3E

MOVING OBJECT INSPECTION SYSTEM

BACKGROUND OF THE INVENTION

1. Field of the Invention

The present invention is related to moving object inspection system, and to be more specific, it is related to moving object inspection systems that use a television camera or the like.

2. Description of the Prior Art

When television cameras are used to inspect moving objects, the inspection was almost impossible when the object to be inspected moves at high speed, because in order to conduct the inspection of objects by the television camera, an image or video signal of the object to be inspected is obtained by scanning the picture screen of the television camera on which the image of the object to be inspected is projected, and therefore a certain period of time is necessary for the object inspection. However, during such certain period of time, if the object to be inspected moves more than a certain degree, in other words, when the moving speed of the object is too fast, the video signal of the object cannot be accurately made and henceforth an accurate inspection of the object becomes practically impossible.

To avoid this defect, there has conventionally been proposals made for methods to obtain a nearly static image of the object by instantaneously driving a stroboscope and irradiating the moving object, but in practical applications the stroboscope light generates considerable amount of noise which overlaps with the image signal on the television camera which causes a bad effect on the inspection in most cases, and consequently the inspection of objects with precision was not possible.

OBJECTS AND SUMMARY OF THE INVENTION

In view of such above considerations, an object of the present invention is to propose a new type of a moving object inspection system using a stroboscope to catch a moving object to be inspected a static condition, in which the image signal is not influenced by noise from the stroboscope or the like.

According to an example of the present invention, a moving object inspection system is provided which comprises:

(a) an image sensing device;

(b) a stroboscope irradiating an object to be inspected and picked up by said image sensing device;

(c) a position detector producing a position signal when said object arrives at a predetermined position; and (d) an object inspection apparatus; characterized in that said object inspection apparatus includes means whereby a period including before and after the horizontal synchronizing signal from said image sensing device is set as an inspection intermission period during which any inspection for said object is not conducted, and said stroboscope is driven to irradiate light at the same timing as the position detection signal when the position detection signal arrives at the same time as the vertical synchronizing signal from said image sensing device, or at the beginning of the inspection intermission period immediately after said position detection signal when said position detection signal arrives at any other time than with the vertical synchronizing signal.

Additional, and other objects, features and advantages of the present invention will become apparent from the following description taken in conjunction with the accompanying drawings.

BRIEF DESCRIPTION OF THE DRAWINGS

FIGS. 3 and 4 are respectively waveform diagrams used to explain the function of the present invention.

DESCRIPTION OF THE PREFERRED EMBODIMENTS

Details of the moving object inspection system according to the present invention as well as its function will become apparent in the following explanation of a preferred embodiment with reference to the drawings.

Figure 1:
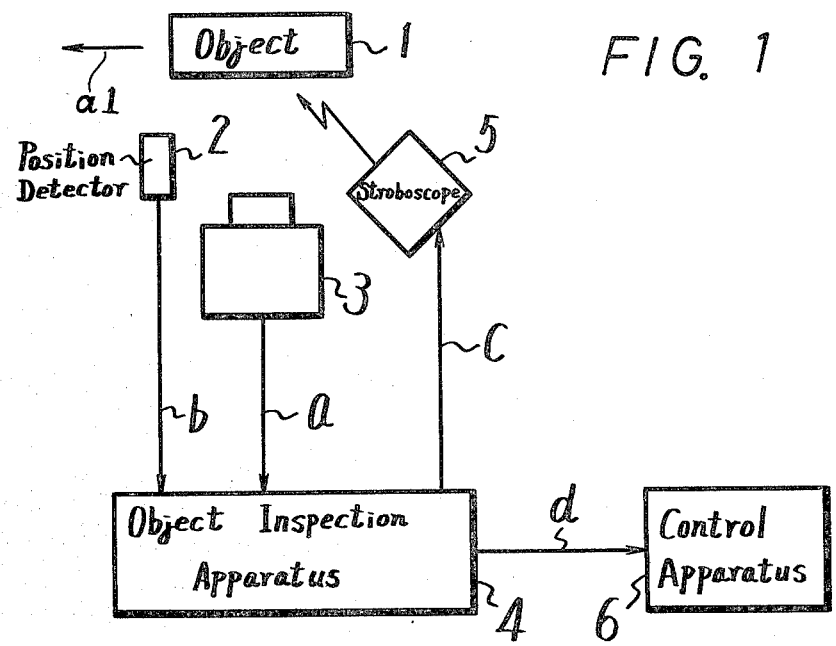
FIG. 1 is a systematic block diagram illustrating an example of the moving object inspection system according to the present invention.

FIG. 1 shows an example of the moving object inspection system by the present invention which uses an image sensing device such as a conventional television camera 3. On the drawing, 1 is an object to be inspected which moves in the arrow direction a1 on the conveyor which is not shown on the figure, 2 is a position detector which detects that the object 1 has arrived at a predetermined position for inspection and then generates a position detection signal b. Image sensing device 3 such as a television camera takes an image of the moving object 1 and generates an image or video signal a and sends the same to an object inspection apparatus 4 when the object 1 arrives at the predetermined position. This object inspection apparatus 4, although later described, is constructed as shown on FIG. 2, and functions to produce a stroboscope signal c in accordance with the signals b and a from the position detector 2 and the television camera 3, which drives a stroboscope 5 to irradiate the object 1 to be inspected, and to output an inspection result signal d by processing image signal a. The stroboscope 5 is energized by signal c from the object inspection apparatus 4. Further, a control apparatus 6 is provided which, by the inspected result signal d from the object inspection apparatus 4, controls the object 1 itself or the transfer system thereof (not shown on the figure).

Figure 2:
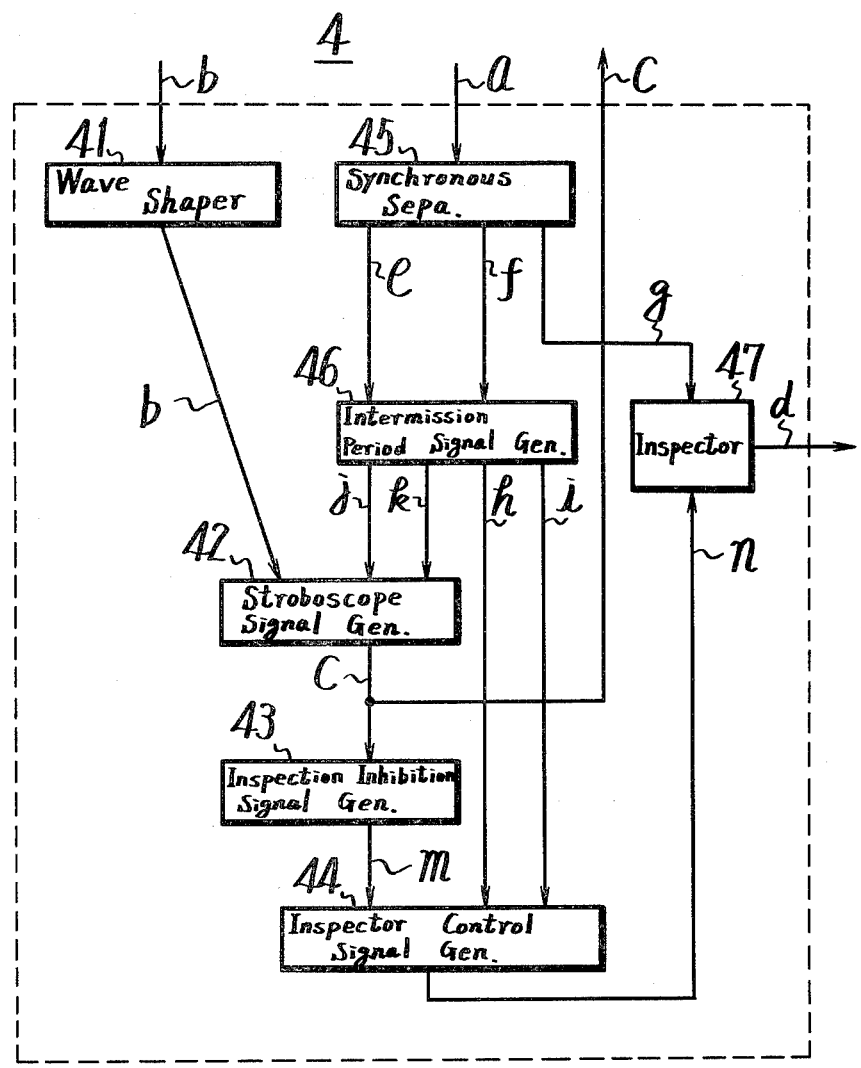
FIG. 2 is a block diagram showing in detail a part of FIG. 1.

FIG. 2 is a block diagram showing an example of the object inspection apparatus 4 with the above mentioned functions. In this example, a wave shaping circuit 41 is provided which receives the position detection signal b from the position detector 2 and wave-shapes it and then sends the same to a stroboscope signal generator 42 such as a one shot multivibrator. A synchronizing signal separator 45 is also provided which receives the image signal a from television camera 3 and then generates a vertical synchronizing signal e as well as horizontal synchronizing signal f and sends these signals e and f to an intermission period signal generator 46 which is includes a combination of one shot multivibrators each having a predetermined time constant, or the like. The synchronizing signal separator 45 further generates an image or video signal g which is in turn sent to an inspector circuit 47 such as a computer. The intermission period signal generator 46 as mentioned above receives the vertical synchronizing signal e as well as the horizontal synchronizing signal f from the synchronizing signal separator 45, and generates a vertical intermission period signal h as well as a horizontal intermission period signal i respectively, which are both sent to an inspector control signal generator 44 such as an AND gate and at the same time also generates a vertical strobe signal j as well as a horizontal strobe signal k which are both sent to the stroboscope signal generator 42. The stroboscope signal generator 42, as mentioned above, receives the position detection signal b from wave shaping circuit 41 as well as the vertical strobe signal j and horizontal strobe signal k from the intermission period signal generator 46 and generates a signal which causes the properly timed energization of the stroboscope 5, in other words, generates a stroboscope signal c, and such stroboscope signal c is supplied to the stroboscope 5 which at the same time is supplied to an inspection inhibition signal generator 43 such as a one shot multivibrator. The inspection inhibition signal generator 43 then generates an inspection inhibition signal m which inhibits the inspection of the object to be inspected for a certain period, and sends the same to the inspector control signal generator 44. When the inspector control signal generator circuit 44 receives the inspection inhibition signal m from the inspection inhibition signal generator 43, it also receives the vertical intermission period signal h as well as horizontal intermission period signal i from the intermission period signal generator 46. Thus, an enable signal n, which controls the inspector circuit 47, is produced by the inspector control signal generator 44 and sent to the inspector circuit 47. The inspector circuit 47, according to the enable signal n which is supplied from the inspector control signal generator 44, inspects the image or video signal g of the object 1 to be inspected which is supplied from the synchronizing signal separator 45, and generates an object detection signal d which is supplied to the control apparatus 6 shown in FIG. 1.

Figure 4A:
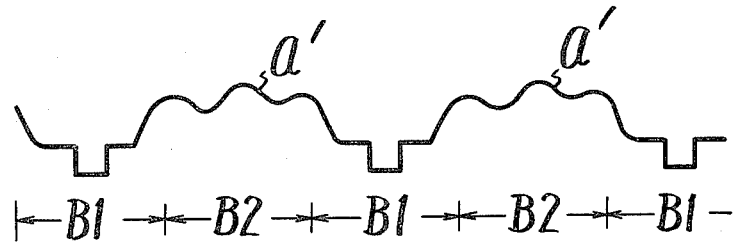
Figure 4B:
Figure 4C:
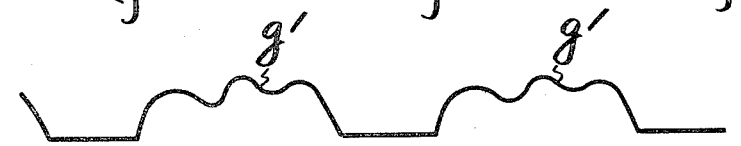
Figure 4D:
Figure 4E:

The operation of the example of the present invention with such construction as illustrated on FIGS. 1 and 2 are as follows. A waveform of the image signal a from the television camera 3 during one vertical period, for example, 16.7 m sec is as illustrated on FIG. 3A. Details in horizontal scanning periods in part of a vertical period, are shown as wave a' on FIG. 4A. The synchronizing signal separator 45 which receives image signal a separates the signal a into vertical synchronizing signal e as shown on FIG. 3B and the horizontal synchronizing signal f as shown on FIG. 4B as well as image signals g and g' as shown on FIG. 3C as well as FIG. 4C. Since the image signal a from television camera 3 is unstable during the periods directly before and after the vertical synchronizing signal e which is a period A1 as shown on FIG. 3A or 3B and the periods directly before and after the horizontal synchronizing signal f which is a period B1 as shown on FIG. 4A or 4B, the inspection of the image signal g of the object 1 is not conducted during such unstable periods of A1 and B1. To this end, the intermission period signal generator 46 produces vertical intermission period signal h as shown in FIG. 3D by receiving the vertical synchronizing signal e and the horizontal intermission period signal i as shown on FIG. 4D by receiving the horizontal synchronizing signal f, from the synchronizing signal separator 45, respectively. These signals h as well as i are sent to the inspector control signal generator 44. Further, the intermission period signal generator 46 produces the vertical strobe signal j based upon the vertical synchronizing signal e and, in the same respect, the horizontal strobe signal k based upon the horizontal synchronizing signal f. These strobe signals j as well as k are sent to the stroboscope signal generator 42. This stroboscope signal generator 42 receives vertical strobe signal j and horizontal strobe signal k from the intermission period signal generator 46 as well as position detection signal b from the wave shaping circuit 41 respectively. When the vertical strobe signal j and the position detection signal b occur at the same time (that is, during the period of A11 as shown on FIG. 3E), stroboscope signal generator 42 generates a stroboscope signal c for energizing the stroboscope 5. When the position detection signal b arrives during period A21 when there is no vertical strobe signal j as shown on FIG. 3E, stroboscope signal generator 42 produces a stroboscope signal c in synchronism with the first horizontal strobe signal k immediately after the position detection signal b arrives, which is the start of period B11 as shown on FIG. 4E.

The stroboscope 5 radiates light upon receiving stroboscope signal c. It is noted that A2 and B2 on FIGS. 3 and 4 respectively are periods during which image signal g or g' is inspected. The inspection inhibition signal generator 43 receives the stroboscope signal c from the stroboscope signal generator 42 and generates an inspection inhibition signal m during a specified period which is sent to the inspector control signal generator 44. The period of this inspection inhibition signal m is the time period during which noise from stroboscope radiation may exist and, depending upon the type of stroboscope used, is normally between 3 to 25 microseconds. The inspector control signal generator 44 receives the inspection inhibition signal m from the inspection inhibition signal generator 43 as well as the vertical intermission period signal h and the horizontal intermission period signal i from the intermission period signal generator 46 and produces the enable signal n which allows to inspect the signal g or g' of the object only during the periods other than during the inspection inhibition signal m which are the vertical intermission period (the period of A1 shown on FIG. 3D) as well as horizontal intermission period (the period B1 shown on FIG. 4D), and sends same to the inspector circuit 47. This inspector circuit 47 receives the image signal g from the synchronizing signal separator 45, inspects the image signal g of the object only during the period specified by the enable signal n, and outputs the inspection result signal d, which is supplied to the control apparatus 6 as above described, by which the object to be inspected itself or the other drive apparatus is controlled.

According to the present invention described above, the radiation timing of the stroboscope 5 is always during the period when the object inspection apparatus 4 is not practically conducting the inspection of the object, and further more, the inspection of the object is not conducted for a specified period after the radiation of the stroboscope 5, therefore, although the stroboscope may radiate noise, such noise does not influence inspection of the object.

Further, even though the stroboscope radiation is delayed from the position detection signal, such delay is less than one horizontal scanning time which is a very short time of about 63 microseconds in normal television cameras, and hence the delay can be ignored. Therefore, by the virtue of the present invention, in utilizing stroboscope radiation, it is possible to catch a static image of the object to be inspected that is moving at high speed, without receiving influence from the noise generated by the stroboscope radiation and hence accurate inspection is achievable.

It will be apparent that many modifications and variations could be effected by one skilled in the art without departing from the spirits or scope of the novel concepts of the present invention so that the spirits or scope of the invention should be determined by the appended claims.

I claim as my invention:

1. A moving object inspection apparatus comprising:
   (a) an image sensing device;
   (b) said image sensing device being of the scanning type in which a video signal, a horizontal synchronizing signal and a vertical synchronizing signal are produced;
   (c) a stroboscope which is effective when energized to illuminate said moving object with a pulse of light short enough to produce a substantially static image of said moving object in said image sensing device;
   (d) a position detector which is effective to produce a position detection signal when said moving object reaches a predetermined position;
   (e) an object inspection apparatus for inspecting said video signal;
   (f) means for inhibiting said object inspection apparatus for horizontal intermission periods extending from before the beginning of each of said horizontal synchronizing signals until after the end thereof and for vertical intermission periods extending from before the beginning of each of said vertical synchronizing signals until after the end thereof;
   (g) means for energizing said stroboscope;
   (h) said means for energizing being responsive to the simultaneous occurrence of said position detection signal with said vertical synchronizing signal; and
   (i) said means for energizing being further responsive to the beginning of the first horizontal intermission period following occurrence of said position detection signal when said position detection signal occurs between successive vertical synchronizing signals.

2. A moving object inspection apparatus according to claim 1, wherein said means for inhibiting includes an intermission period signal generator responsive to said vertical and horizontal synchronizing signals to generate said vertical and horizontal intermission periods and vertical and horizontal strobes.

3. A moving object inspection apparatus according to claim 1, wherein said means for energizing is responsive to said vertical and horizontal strobes and said position detection signal to produce a stroboscope signal.

4. A moving object inspection apparatus according to claim 3, wherein said means for inhibiting further includes an inspection inhibition signal generator responsive to said stroboscope signal to produce an inspection inhibition signal and an inspector control signal generator responsive to any one or more of said vertical and horizontal strobes to remove an enable signal from said object inspection apparatus whereby inspection of said video signal is interrupted.

5. A moving object inspection apparatus according to claim 4, wherein said inspector control signal generator is further responsive to said inspection inhibition signal to remove said enable signal.

* * * * *